TELEPHONE ILLUMINATOR

Filed Dec. 16, 1960

INVENTORS R. E. PRESCOTT
W. E. WHIDDEN
BY V. P. Priolo

ATTORNEY

United States Patent Office 3,135,470

Patented June 2, 1964

3,135,470

TELEPHONE ILLUMINATOR

Robert E. Prescott, Bernardsville, and William E. Whidden, Chatham, N.J., assignors to Bell Telephone Laboratories, Incorporated, New York, N.Y., a corporation of New York Filed Dec. 16, 1960, Ser. No. 76,353
3 Claims. (Cl. 240—2.17)

Figures 1, 3:
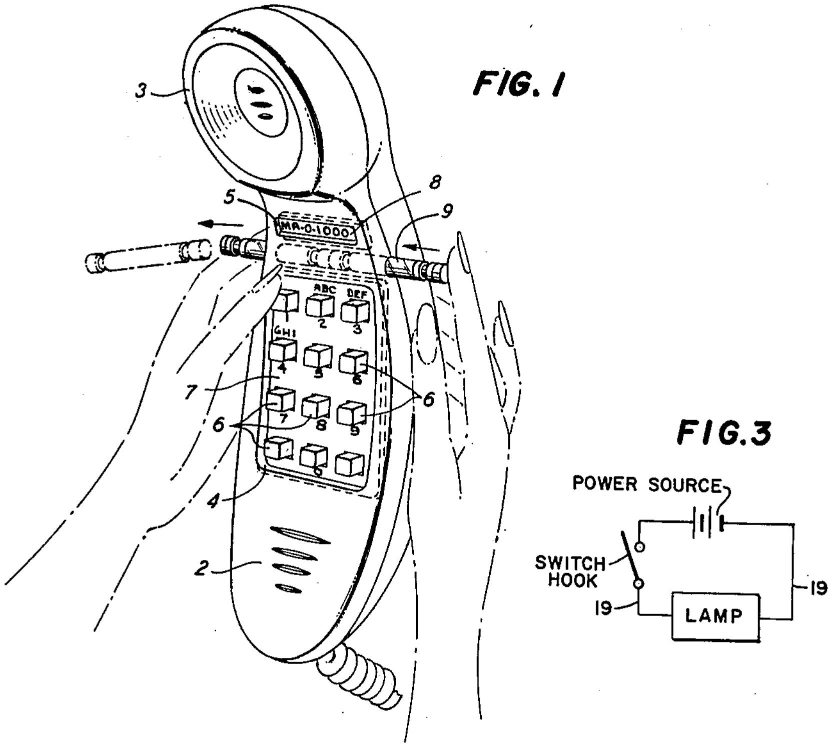

This invention relates to illuminating arrangements, and more particularly, although in its broader aspects not exclusively, to apparatus for rendering selected portions of a telephone set luminescent.

It is well recognized that solids which diffuse light rays find advantageous use in the field of telephone illumination. Specifically, uniform luminescence throughout the entire volume of a diffusing solid is accomplished by bringing only a fragment of the surface of such a solid into proximity with a light source. Since external fixtures generally tend to detract from the compactness and overall appearance of a telephone set, it has been found most desirable, from a design standpoint, to intern the light source within the casing of the instrument to be illuminated. One example illustrating such an embodiment is disclosed in copending patent application Serial No. 819,678, filed on June 11, 1959, now Patent No. 2,988,631, in the names of H. J. Hershey et al.

Since lamp technologists have not as yet perfected a perpetual light source, maintenance problems present a significant obstacle to the use of internally disposed lamps. Studies have indicated reluctance on the part of subscribers to change lamps in their own telephones, particularly when such procedures involve either dismantling the set's casing in any manner, or require special tools. If it were necessary, however, to dispatch a serviceman solely to replace burned out lamps, replacement costs would be prohibitive.

Accordingly, it is a principal object of this invention to simplify lamp replacement in telephone sets utilizing internal lighting device.

It is a more specific object of this invention to permit replacement of internally housed lamps without the necessity of either employing tools or dismantling the housing.

According to the principles of the invention, a channel is extended through a pair of opposite external surfaces of a telephone set, and a lamp is disposed within the channel to illuminate selected portions of the set.

A principal feature of the invention resides in a light source adapted to be directly insertable into a telephone set without dismantling the set or any part thereof.

Another feature of the invention resides in a lamp internally disposed in a telephone set and adapted to be ejected from its housing by insertion into the set of a replacement lamp. A related feature of the invention resides in a symmetrical lamp constructed to be insertable from either end into a telephone set.

A further feature of the invention resides in electrical coupling means which conduct power to energize a lamp seated in a receptacle regardless of the lamp's angular orientation with respect to the receptacle.

Another feature of the invention resides in a pair of supporting members which are disposed in the telephone set in such a manner as to secure the light source in position and couple it to a power source.

Still another feature of the invention resides in means for positioning the light source in proximity with the dial faceplate of a telephone set in order to achieve uniform illumination. A related feature of the invention resides in an arrangement for conveniently illuminating with a common light source both the number panel and dial faceplate of a telephone set.

Figure 2:
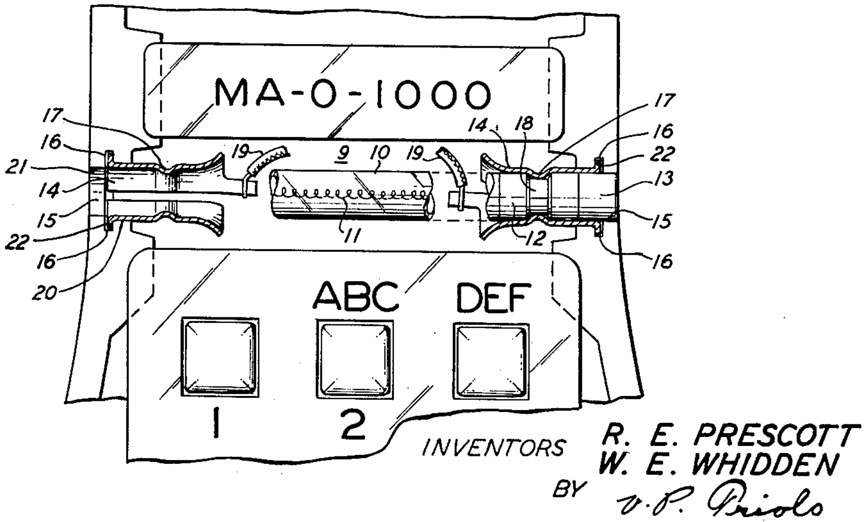

The foregoing and other features and objects of the invention will be more thoroughly understood by referring to the following detailed description of an illustrative embodiment of the invention and the accompanying drawing in which:

FIG. 1 illustrates the ease with which internally disposed lamps are replaced according to the invention;

FIG. 2, in sectional view, depicts an illustrative embodiment of supporting members with which such a lamp is secured; and FIG. 3 is a diagram schematically showing the lamp of the invention connected in circuit with a source of power.

With reference directed to FIG. 1 of the drawing, the invention is shown conveniently embodied in a telephone dial-in-handset. In frontal view, the handset is substantially oval in shape, having a transmitter 2 located at its lower end, a receiver 3 located at its upper end, and two centrally situated rectangular apertures 4 and 5 longitudinally displaced from each other. Positioned behind aperture 4, in such manner that all but its periphery is exposed, is a dial faceplate 7 through which a plurality of plungers 6 protrude in a conventional touchtone dial array. Similarly disposed behind aperture 5 is a number panel 8. To effect, by means of a concentrated light source, uniform luminescence throughout their entire volumes, both dial plate 7 and number panel 8 are constructed of a light-diffusing plastic such as methacrylate, more commonly known as Lucite. In one attractive arrangement, appropriate alphabetical and numerical characters are stamped on the rear surfaces of these elements and filled with white lacquer. The dial plate and number panel are then backed with a relatively dark colored card. When a light source is brought into proximity with these elements, as will be subsequently explained in detail, the characters appear to glow white on a dark background.

Disposed slightly below the front face of the handset at a point approximately centered between dial faceplate 7 and number panel 8, is a laterally directed cylindrical channel. As shown, the channel extends through opposite side surfaces of the handset via a pair of tunnels, and is adapted, as illustrated by the detailed drawing of FIG. 2, to embrace a tubular lamp 9.

With reference directed specifically to FIG. 2, the tunnels 15 forming the openings of the channel are each shown in cross section as comprising inner and outer coaxial passages, 20 and 21, respectively, the diameter of the inner passage being slightly greater than that of the outer. Separating inner passage 20 from outer passage 21 in each tunnel 15 is a groove 16 which is preferably oblong in cross section. A pair of slotted, annular supporting members 14, preferably constructed of resilient metal, are coaxially disposed in the channel. As shown, each member 14 is slightly flared at one end and is secured at the other end to a tunnel 15 by means of a flange 22 shaped to fit groove 16. Approximately centered along the longitudinal dimension of each member 14 is a circumferential boss 17. While for ease of maintenance and facilitation of replacing worn parts, the embodiment described herein includes individual, separately replaceable supporting members 14, it should be apparent to one skilled in the art that numerous other arrangements may be fabricated without departing from the scope of the invention.

Seated in the channel is a tubular-shaped incandescent lamp 9 comprising a glass envelope 10, a filament 11, a pair of circumferential metallic bands 12 to which the ends of filament 11 are connected, and a pair of terminating plastic caps 13. Lamp 9 is coextensive in length with the channel, the end surfaces of plastic caps 13 being substantially flush with the side surfaces of the handset. Each metallic band 12 has a circumferential furrow 18 positioned to seat a corresponding boss 17, thereby restraining lateral movement of lamp 9 when properly located in the channel. Power to illuminate lamp 9 is supplied through a pair of lead wires 19, which are coupled to filament 11 by supporting members 14 and metallic bands 12, and may be conveniently controlled, as illustrated in FIG. 3, by means including a conventional switchhook, as disclosed in United States Patent 2,949,509 granted on August 16, 1960, to W. E. Whidden.

As pictorially demonstrated in FIG. 1, inoperable lamps may be readily ejected without dismantling any portion of the set's casing and without the aid of any tools whatsoever by manually injecting a new lamp into either end of the channel. Being constructed of a resilient material, supporting members 14 release lamp 9 upon exertion of lateral pressure on the walls of boss 17, and subsequently spring back into their former position when a new lamp is properly situated within the channel. Guide structure by which a lamp is correctly directed through the channel is provided by the walls of tunnel 15 and the neck formed by boss 17, the flared ends of the supporting members 14 also functioning in this respect by funneling the lamp, if slightly deflected, to the far tunnel. Since supporting members 14 are relatively short with respect to the length of the lamp, a maximum quantity of light energy is concurrently applied to the edges of both dial faceplae 7 and number panel 8.

Although only a single illustrative embodiment of the invention has been described herein, it should be evident to one skilled in the art that numerous other arrangements may be conceived without departing from the scope and spirit of the invention. It is particularly emphasized that the principles of the invention embrace the entire field of instrumentation and are in no way restricted to dial-in-handset telephone, or, for that matter, to telephones in general.

What is claimed is:

1. An illuminating device characterized by simplified means for substituting replacement lamps for inoperable lamps comprising an instrument having an unobstructed channel extending through a pair of openings in opposite external surfaces thereof, said channel being defined by a longitudinal axis, a lamp, said lamp being defined by a longitudinal axis, supporting means for receiving said lamp coaxially with said channel when a lamp is injected into either end of said channel, coupling means connected to said lamp for transferring power to said lamp, said supporting means releasably gripping said lamp in said channel in alignment with said openings to enable ejection of said lamp from either end of said channel by the injection of a replacement lamp into the other end thereof, and said supporting means being disposed axially along said channel and intermediate the ends thereof.

2. An illuminating device in accordance with claim 1 wherein said lamp includes first and second end portions both of which are injectable into said channel.

3. An illuminating device in accordance with claim 1 wherein said supporting means includes a pair of resilient contact bands circumferentially positionable around said coupling means, said bands being axially positioned along said channel in such manner as to make electrical contact with said coupling means regardless of the angular orientation of said lamp with respect to said channel.

References Cited in the file of this patent

UNITED STATES PATENTS

| | | |
|---|---|---|
| 1,839,479 | Hartman | Jan. 5, 1932 |
| 2,283,098 | Shann | May 12, 1942 |
| 2,298,207 | Gent | Oct. 6, 1942 |
| 2,346,166 | Hurleman | Apr. 11, 1944 |
| 2,541,941 | Shenk | Feb. 13, 1951 |
| 2,561,950 | Shenk | July 24, 1951 |
| 2,754,408 | Bolsey | July 10, 1956 |
| 2,835,787 | Mihalyi | May 20, 1958 |

FOREIGN PATENTS

| | | |
|---|---|---|
| 1,020,398 | France | June 6, 1950 |

OTHER REFERENCES

Void British application 785,950, 1957.